US009805195B1

United States Patent
Bonang et al.

(10) Patent No.: US 9,805,195 B1
(45) Date of Patent: Oct. 31, 2017

(54) SYSTEM AND METHOD FOR TRANSFERRING FILES BETWEEN COMPUTER SYSTEMS USING INFORMATION INVARIANT DATA TRANSFORMATION

(71) Applicant: The Boeing Company, Chicago, IL (US)

(72) Inventors: James Joseph Bonang, Garden Grove, CA (US); Marco Anthony Corrado, Westminster, CA (US); Michael Cohen Hogan, Huntington Beach, CA (US); Kevin Dale Singer, Fountain Valley, CA (US)

(73) Assignee: The Boeing Company, Chicago, IL (US)

( * ) Notice: Subject to any disclaimer, the term of this patent is extended or adjusted under 35 U.S.C. 154(b) by 135 days.

(21) Appl. No.: 14/028,658

(22) Filed: Sep. 17, 2013

(51) Int. Cl.
G06F 21/56 (2013.01)

(52) U.S. Cl.
CPC .......... G06F 21/568 (2013.01); G06F 21/567 (2013.01)

(58) Field of Classification Search
CPC ...... G06F 21/566; G06F 21/564; G06F 21/56; G06F 21/568; H04L 63/0227
USPC ......................................................... 726/23
See application file for complete search history.

(56) References Cited

U.S. PATENT DOCUMENTS

| | | | | |
|---|---|---|---|---|
| 5,905,819 A * | 5/1999 | Daly | ..................... | G06T 1/0028 358/1.9 |
| 6,763,462 B1 * | 7/2004 | Marsh | ................... | G06F 21/566 709/206 |
| 2008/0209551 A1 * | 8/2008 | Treacy | ..................... | G06F 21/53 726/22 |
| 2009/0217258 A1 * | 8/2009 | Wenzinger | ................ | G06F 8/62 717/173 |
| 2010/0031361 A1 * | 2/2010 | Shukla | .................. | G06F 21/568 726/24 |
| 2010/0175133 A1 * | 7/2010 | Ness | ..................... | G06F 21/568 726/23 |
| 2012/0159606 A1 * | 6/2012 | Sobolewski | ............ | G06F 21/56 726/12 |

OTHER PUBLICATIONS

Garsiel, et.al, How Browsers Work: Behind the scenes of modern web browsers, self published [online] Aug. 2011. Retreived from the inetnet<URL:http://www.html5rocks.com/en/tutorials/internals/howbrowserswork/>.*
CERT. Malicious HTML Tags Embedded in Client Web Requests, Joint Task Force for Computer Network Devense, [online] Feb. 2000. Retreived from the internet<URL:https://www.cert.org/historical/advisories/CA-2000-02.cfm>.*

* cited by examiner

Primary Examiner — Benjamin Lanier

(74) Attorney, Agent, or Firm — Kunzler, PC

(57) ABSTRACT

Systems and methods using Information-invariant Data Transformation (IIDT) in the transfer of files from an un-trusted to a trusted computer system are disclosed. The IIDT alters the data representation of information, without altering the meaning of the information to a degree that is perceptible to a human consumer of that information. The data transformation operations eliminate embedded malware thereby providing secure transfer of files between the un-trusted and trusted computer systems.

21 Claims, 4 Drawing Sheets

SYSTEM AND METHOD FOR TRANSFERRING FILES BETWEEN COMPUTER SYSTEMS USING INFORMATION INVARIANT DATA TRANSFORMATION

BACKGROUND

Current computing systems rely upon anti-virus (AV) software and message filters to allow the secure transfer of files from un-trusted computing systems into trusted computing systems. An un-trusted computing system may consist of, for example, a single unclassified computer system, a network of unclassified computer systems, or a publicly accessible corporate computer network. A trusted computing system may consist of, for instance, a classified computer system or network, or a private corporate network. Un-trusted computing systems and trusted computing systems are referred to generally as un-trusted and trusted computer systems.

Current systems for transferring files from an un-trusted to a trusted computer system rely on anti-virus (AV) software to eliminate malware hidden within uploaded files. This approach, however, is not without certain drawbacks. First, the AV software's malware definitions must be continuously updated to ensure that the file transfer is conducted with up-to-date virus definitions. Second, the malware definitions may not include signatures for malware not previously encountered and so cannot prevent zero-day attacks.

SUMMARY

Apparatus and methods using Information-invariant Data Transformation (IIDT) in the transfer of files from an un-trusted to a trusted computer system are disclosed. Information-invariant data transformation alters the data representation of information, without altering the meaning of the information to a degree that is perceptible to a human consumer of that information. For example, Joint Photographic Experts Group (JPEG) compression may be applied to an image thereby altering the data of the image file. However, the compressed image file appears identical in its essential characteristics to a human observer; that is, the data representation of the image is transformed, but the information it conveys is unchanged or invariant. The IIDT uses its data transformation operations to eliminate embedded malware thereby providing secure transfer of files between the un-trusted and trusted computer systems.

The disclosed IIDT processing system is configured to: 1) load a file from the un-trusted computer system into the volatile memory; 2) apply an information-invariant data transformation (IIDT) to the file in the volatile memory; 3) and make the transformed file available in a persistent storage that is accessible by the trusted computer system. In various examples, the processing system is configured to execute one or more operations during application of the IIDT. For instance, the processing system may perform a lossy transformation of a file, such as compression of an image file. It may also redact metadata from the file during application of the IIDT. When the file from the un-trusted computer system is a lossless format file, the processing system may transform the lossless format file to a lossy format file during application of the IIDT. Further, the processing system may be configured to apply a random steganographic operation to the file during application of the IIDT, thereby randomizing the transformation. Other systems and methods using IIDT processes for malware protection are likewise disclosed.

The features, functions, and advantages that have been discussed can be achieved independently in various embodiments or may be combined in yet other embodiments further details of which can be seen with reference to the following description and drawings.

DETAILED DESCRIPTION

Figure 1:
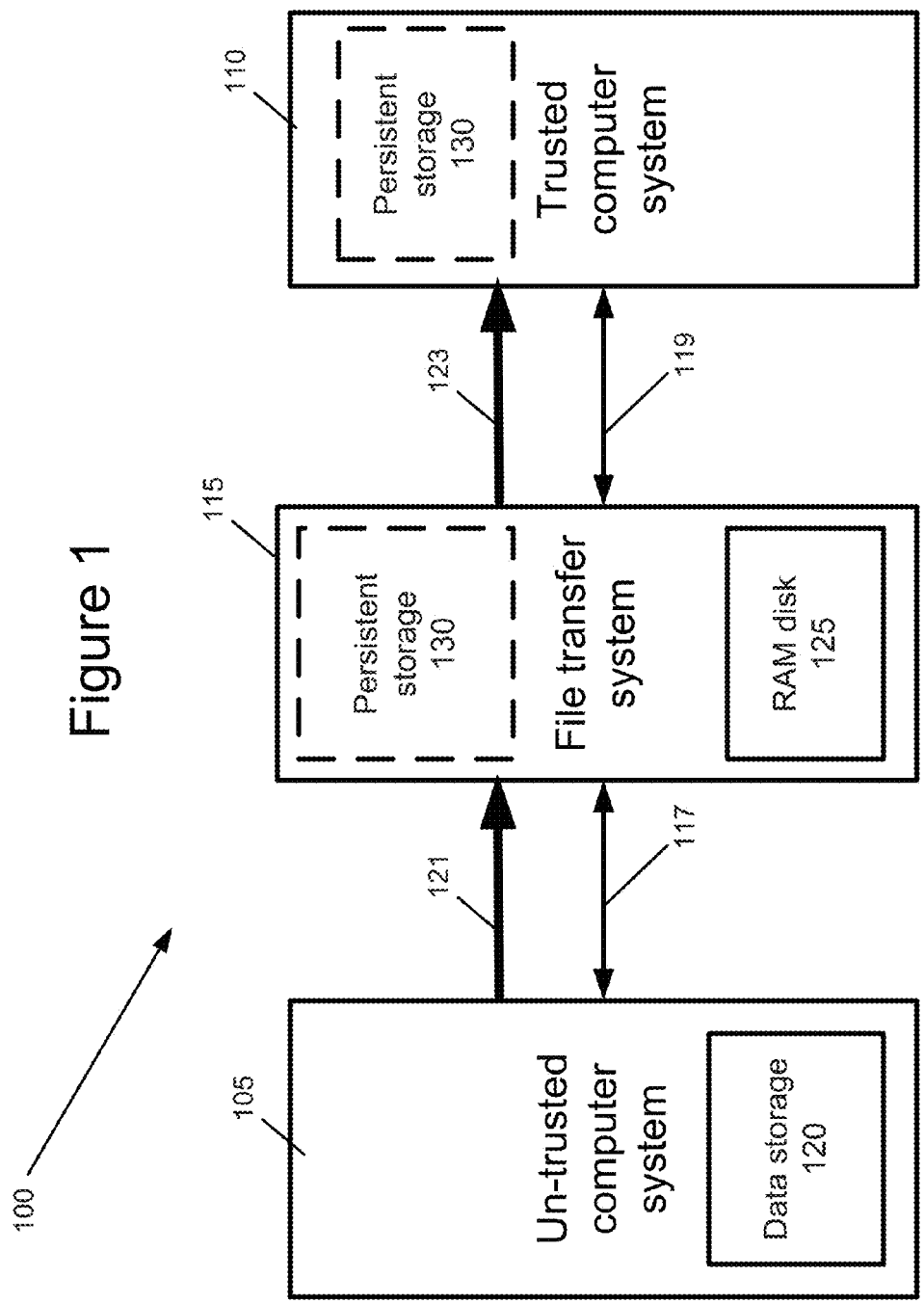
FIG. 1 is a block diagram of a system having an un-trusted computer system, a trusted computer system, and a file transfer system configured to securely transfer files from the un-trusted computer system to the trusted computer system.

FIG. 1 is a block diagram showing a system 100 having an un-trusted computer system 105, a trusted computer system 110, and a file transfer system 115. The file transfer system 115 may be implemented by a processing architecture that includes, for example, the trusted computer system 110, a separate Cross-Domain Gateway (CDG) apparatus, add-on components of the trusted computer system 110, or a combination of such elements.

Here, the un-trusted computer system 105 is in bidirectional communication with the file transfer system 115 along communication bus 117. The file transfer system 115 is in bidirectional communication with the file transfer system 115 along communication bus 119. However, as shown by data transfer arrows 121 and 123, the original files in data storage 120 of the un-trusted computer system 105 are transferred through the file transfer system 115 for access by the trusted computer system 110 in a single direction. In FIG. 1, for example, data is transferred from data storage 120 to RAM disk 125, where it is subject to various transformations. The transformed data is made available to the trusted computer system 110 in persistent storage. The persistent storage 130 may be part of the file transfer system 115, the trusted computer system 110, independent storage, or the like.

The un-trusted computer system 105 may include portable devices, such as digital cameras, smart phones, un-trusted laptops, un-trusted desktops, un-trusted tablet computers, and other low-security devices. Audio files, image files, and text files 135 may be acquired by and stored in such devices for subsequent upload to the trusted computer system 110.

Most of the foregoing devices of the un-trusted computer system 105 lack the security features needed to transfer the stored files to the trusted computer system 110. Therefore, a cross computer system solution is needed to transfer data from the un-trusted computer system 105 to the trusted computer system 110 in a secure manner. As will be set forth below, the file transfer system 115 facilitates secure transfer of the data between the computer systems 105 and 110 using techniques that provide protection from malware and zero-day attacks without the need for constant antivirus definition updates.

The file transfer system 115 differs in several ways from a conventional file transfer system. More particularly, the file transfer system 115 executes Information-Invariant Data Transformations (IIDT) on files received from the un-trusted computer system 105 before making the transformed files available to the trusted computer system 110. In this regard, the information conveyed in certain types of data files is invariant when specific transformations are applied to the data. For example, the binary representation of two JPEG image files that apparently display the same image can be different if one of the files is a compressed version of the other. Although the binary representations are different, the information conveyed in both files is substantially identical as perceived by an individual. The information in the original file is said to be invariant under the data compression transformation.

Figure 2:
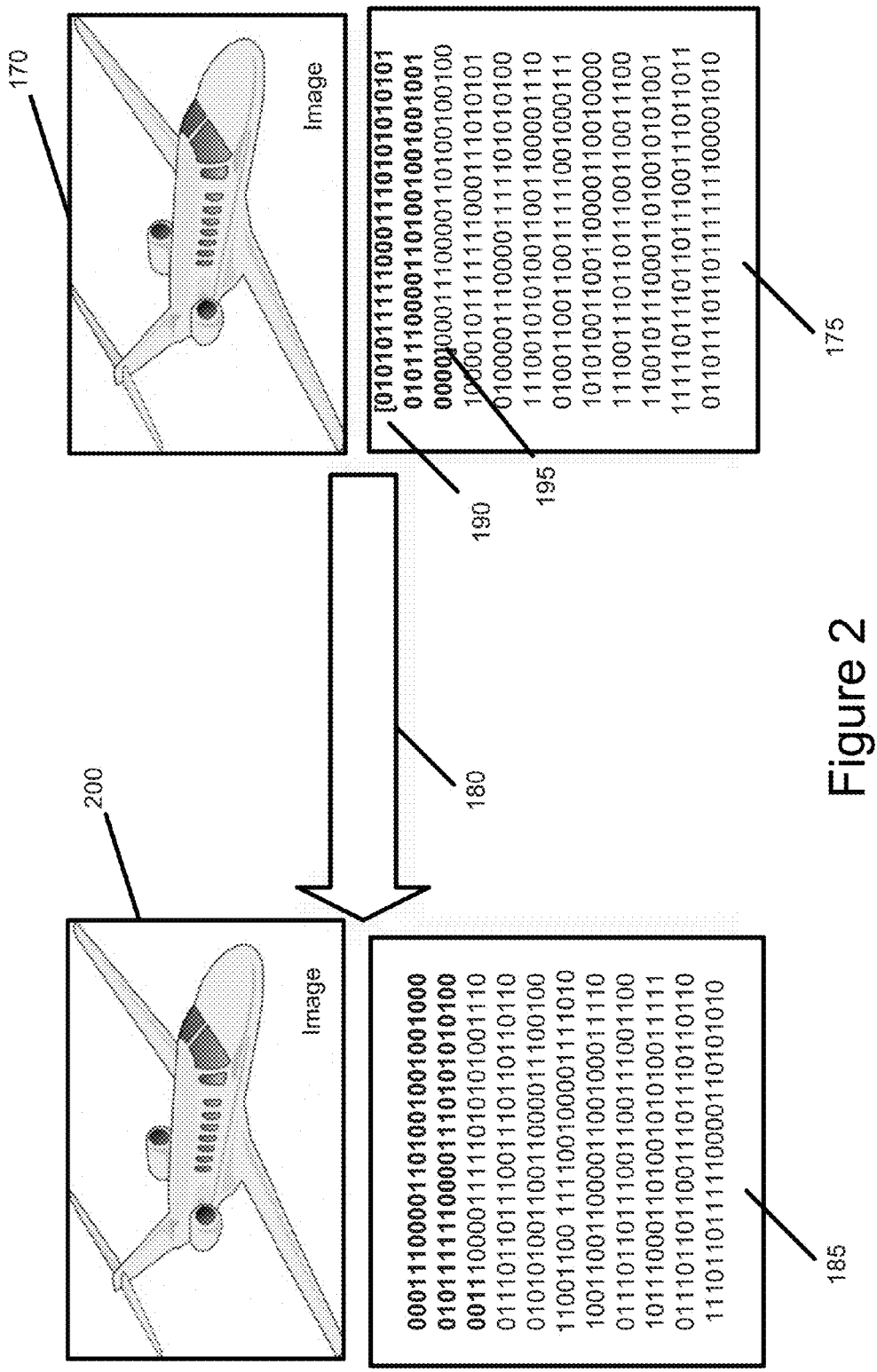
FIG. 2 illustrates the effect that an information-invariant data transformation (IIDT) process may have on the transfer of an image, such as a JPEG image, from the trusted computer system to the un-trusted computer system.

FIG. 2 illustrates the effect that the IIDT may have on the transfer of an image, such as a JPEG image, from the un-trusted computer system 105 to the trusted computer system 110. In FIG. 2, a JPEG image 170 from the un-trusted computer system 105 is represented as binary data 175. The file transfer system 115 executes an IIDT as shown by arrow 180 before making the transformed binary data 185 available to the trusted computer system 110. In this example, binary data between 190 and 195 represents malware. As a result of the IIDT, the binary data of the malware has been altered by the file transfer system 115, thus destroying the malware, while the appearance of the image remains unchanged insofar as a human observer can perceive. This transformed binary data 185 may be used by trusted computer system 110 to reproduce the image 200, which substantially corresponds to JPEG image 170. As set forth below in further detail, similar transformations may be executed on other file types, such as audio files, video files, text files, etc.

The IIDT operations executed by the file transfer system 115 are used to eliminate malware embedded in otherwise innocuous files. The operations also facilitate destruction of robust embedded malware (i.e., designed to survive transformations in at least a degraded state). Additionally, they eliminate malware designed to reconstitute itself after undergoing a known transformation. To accomplish this, the IIDT operations may employ several techniques, including: 1) transformation of a file from a lossless format to a lossy (or "noise tolerant") format; 2) transformation of the file using lossy transformations (such as JPEG compression of images); 3) randomization of lossy transformation properties (e.g. variation in the degree of compression of JPEG images); 4) file metadata redaction (redact metadata from files such as JPEG Exif Metadata and embedded GIF thumbnail images); and/or 5) random steganography (the insertion of random data ("noise") within a file that is imperceptible to the user).

The IIDT operations may also use supplemental data provided by additional operations executed by the file transfer system 115. For example, the IIDT operations may include: 1) using entropy generators to seed pseudorandom number generators; 2) using long-period random number generators (e.g. dual linear congruential pseudorandom number generators); and/or 3) using RAM disk, where the original files are read in to RAM disk and never persisted in a manner in which the original files are accessible to the trusted computer system 110.

In the example of FIG. 1, one or more original data files 205 stored in the un-trusted computer system 110 are scheduled for transfer to the trusted computer system 110 using the file transfer system 115. The IIDT operations secure importation of many standard file types including image files, audio files, video files, text files (including text files formatted in a markup language), and word processor files. File types supported by the exemplary IIDT implementation have known file extensions and known file formats. For example, JPEG image files use the .jpg file extension and have markers at specific locations within the file, along with other known indicators. These markers and indicators can be checked by the file transfer system 115 along with the file extension to ensure the file to be imported is of the type corresponding to its extension. Only files having file extensions supported by the IIDT implementation are candidates for importation. To this end, each file with a known extension is examined to determine if it conforms to the format for a file of that type. If the file conforms, it is a candidate for further processing. If it does not conform, it is not subject to further processing.

As noted, the file transfer system 115 is configured to apply the IIDT operations on the files received from the un-trusted computer system 105 before making the transformed files available to the trusted computer system 110. In this example, the IIDT operations are executed using a first memory storage area 210 of the file transfer system 115. The file transfer system 115 is further configured to make the transformed file available in a second memory storage area 215 that is accessible to the trusted computer system 110. To ensure that the trusted computer system 110 is not exposed to the original data files, the first memory storage area 210 is isolated from the second memory storage area 215. One architecture in which the memory storage areas may be isolated from one another uses non-volatile memory, such as a RAM disk, for the first memory storage area 210, and a separate persistent data storage device for the second memory storage area 215.

Figure 3:
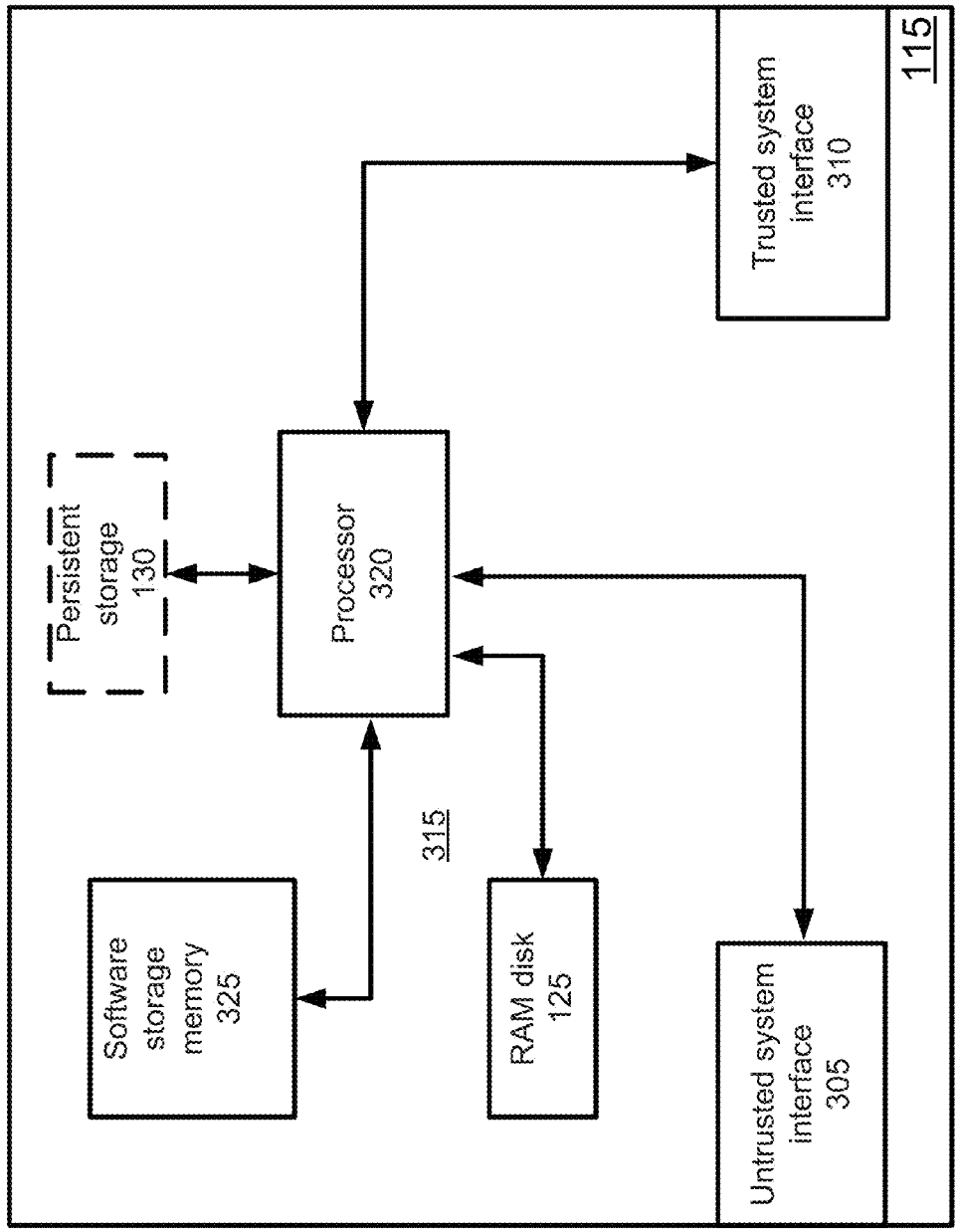
FIG. 3 is a schematic block diagram of one example of a file transfer system that may be used to transfer files between a trusted and an un-trusted computer system.

FIG. 3 is a schematic block diagram of one example of the file transfer system 115. In this example, the file transfer system 115 is configured to receive files from the un-trusted computer system 105 at un-trusted system interface 305. Communication between the file transfer system 115 and the trusted computer system 110 is provided through a trusted system interface 310. Both system interfaces 305 and 310 are in communication with a processing system, shown generally at 315.

The processing system 315 of FIG. 3 includes a processor 320 in communication with the system interfaces 305 and 310 as well as with various memory storage areas. In this example, the memory storage areas include software storage memory 325, volatile memory such as RAM disk 125, and persistent storage 130. The software storage memory 325 includes code that is executable by processor 320 to implement file transfer between the computer systems 105 and 110, as well as to implement the IIDT operations. The RAM disk 125 is used for temporary storage of the files received from the trusted computer system 105. Once a file received from the un-trusted computer system 105 has been transformed, it is stored in persistent storage 130. The files in persistent storage 130 are available to the trusted computer system 110 over the trusted system interface 310. Additionally, or in the alternative, the transformed files may be conveyed over the trusted system interface 310 to persistent storage located in the trusted computer system 110.

Figure 4:
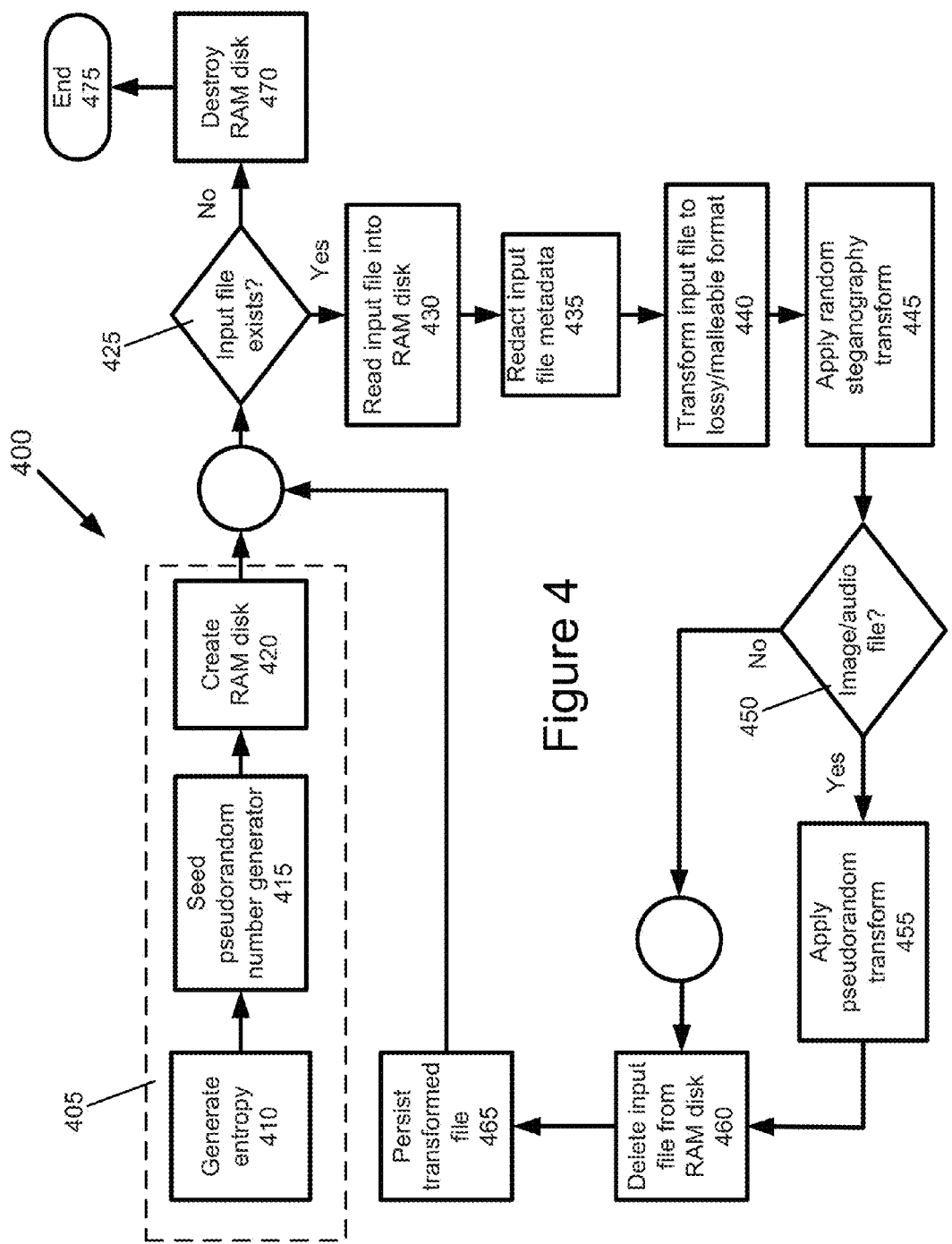
FIG. 4 is a flowchart showing a method 400 that may be used to transfer data between an un-trusted and trusted computer system.

FIG. 4 is a flowchart showing a method 400 that may be used to transfer data between an un-trusted and trusted computer system. In this example, the method 400 includes several preparatory operations, shown generally at 405. These operations include generating entropy 410, using the generated entropy to seed pseudorandom number generation 415. The IIDT operations use random data or "noise" for several steps. The pseudorandom number generation at 415 produces this random data using the entropy generated by operation 410. Entropy may be generated by recording random mouse pointer movements made by an application user, or other means, depending on the platform and the application incorporating IIDT. On Linux, the /dev/random special file collects environmental noise from device drivers and other sources. The /dev/random special file may block if the entropy pool becomes depleted in a manner that reduces the large volume of pseudo-random numbers needed by the IIDT operations. Accordingly, the /dev/random may be accompanied with other entropy generation operations. However, the entropy pool is unlikely to be depleted if /dev/random is used only to seed another pseudo-random number generator.

The long-period pseudorandom number generation used to generate random data or noise for subsequent steps is seeded at operation 415. The pseudorandom number generation may have a long period, such as the long period that is generated using a dual linear congruential generator. The /dev/urandom special file, which is similar to /dev/random but does not block when the entropy pool is depleted, could also be used.

A RAM disk is created at operation 420. The RAM disk allows volatile memory to behave as if it were part of a file system, emulating persistent storage. The RAM disk holds any input files or other temporary files used during the IIDT process.

Operations 425 through 465 comprise the main body of the IIDT procedure. At operation 425, a check is made as to whether an input file exists that has been scheduled for transfer from the un-trusted computer system 105. If no scheduled input files remain, then the RAM disk is destroyed at 470, and the method terminates at 475.

The input file read in to the IIDT application at operation 430 will be of a known type such as a JPEG or PNG image file, an MP3 audio file or a Microsoft Word word processor document. The file may be read into the RAM disk file system or read in to RAM or other volatile memory at operation 430. However, the method 400 may limit processing of files from the un-trusted computer system 105 to standard file types with specific file extensions. The files may be examined to determine if they adhere to the expected format. For example, JPEG files are examined to determine if appropriate values are present at specific locations within the file, consistent with the JPEG standard. Files that do not correspond to the standard, or have extra data past the end marker, are not processed.

Metadata is redacted from the input file at operation 435. For example, if the input file is a JPEG image file, it contains text data such as the time the picture was taken, the location at which the picture was taken, and the type of camera used. A GIF thumbnail image may also be embedded in the JPEG file. If present, the GIF image may be deleted to eliminate potential malware. Further, Exif metadata, which is expressed as text strings, may be examined and deleted, truncated or otherwise altered. For instance, if the Exif metadata geolocation data contained data beyond that required to specify the latitude and longitude at which the image was taken, the extra characters may be removed.

The IIDT may handle input files in a lossy format and input files in a lossless format differently. Input files in a lossy format have been subject to a lossy compression prior to receipt from the un-trusted computer system 105. Lossy compression involves removal of some data removed from a file in order to make it smaller, in which case it is representable with fewer bytes. This is contrast to lossless compression, where the representation of the data is simplified and compacted, but no data is lost. The original file can be directly restored using lossless compression, but cannot be using lossy compression. File formats such as JPEG, an image file format, are lossy formats. Compressing a JPEG file results in removal of data from the file, and that data cannot be recovered from the transformed file. Other file formats, such as PNG, another image file format, are lossless. The original PNG file can be completely recovered from the compressed version.

The IIDT relies upon input files using a lossy or "noise tolerant" format for many file types, such as the JPEG format for image files. If the input file is not in a lossy format, it is transformed to a lossy/malleable format at operation 440. For example, if the input file is in a lossless format, such as a PNG image file, it is converted to a lossy format, such as JPEG. In the case of word processor documents, such as Microsoft Word documents, the file is transformed from the word processor format to a text file, using a markup language, such as Markdown. While a text file is not a lossy format, the data representation may still be transformed without altering the information it contains, in which case the markup language representation is said to be "malleable," as opposed to "lossy." The transformation operation 440 may be executed concurrently with the input file read operation 430.

Random steganography is applied to the intermediate, transformed file at operation 445. For example, random data may be injected into a JPEG image file. The random data is generated at operations 410 and 415. The appearance of the JPEG image is not perceptibly altered by the insertion of the random data. However, the binary data representation of the image is altered thereby neutralizing malware in the image file by scrambling its binary data with the random data. Random data may also be injected into lossy audio files and lossy video files with the same neutralizing effect.

Word processor files and text files, as well as other file types, such as those for Microsoft PowerPoint, can be converted to JPEG image files at operation of 440. The resulting JPEG image files are therefore images of such documents. Once in an IIDT compatible format, IIDT may be applied.

Another approach is to convert word processor files, such as Microsoft Word files, to a text file employing a markup language such as Hypertext Markup Language (HTML) or Markdown. Once the document is represented in a markup language, markup language comments and non-printing characters, invisible to the user when the file is rendered but present in its binary data representation, may be inserted at random locations within the file. The comments may contain random characters and be of random length. While they will increase the file size and may reduce the readability of the source representation, they will not degrade the information in the rendered document. Moreover, in rendered form, the changes may be imperceptible to the user. As the changes are both random and imperceptible in rendered form, the insertion of random comments into a markup language file constitutes random steganography.

Another transformation that can be executed at operation 445 to alter the binary data representation of the file but not the information it conveys is to insert additional tabs, spaces, newlines, and/or non-printable characters into the text of the file. This may affect the readability of the text file, however, depending on where the whitespace and non-printable characters are inserted. Although whitespace characters such as newlines, tabs, and space characters may be perceptible to the user, for purposes of the exemplary method 400 the random insertion of these characters is treated as a random steganographic operation. However, insertions of some non-printable characters change the document in ways that cannot be perceived in the rendered form of the file. Insertions of these characters retain the property of being imperceptible and thus rigidly conform to what is known as a random steganographic operation.

A markup language format for a document may be described as "malleable," at least in comparison with the binary representation of a word document. Random steganographic transformations may be applied to a markup language document, even though the document is not in a lossy file format.

In the following example, an input Hypertext Markup Language (HTML) file is transformed. Whitespace is inserted at random into the file along with HTML comments. HTML comments have the form:

<! This is an HTML comment>

An exemplary input file may be represented in the following manner:

```
<!DOCTYPE html>
  <html>
    <body>
      <h1>Document Title </h1>
        <p>Sample    paragraph.    embedded_malware_string </p>
    </body>
  </html>
```

The text for the input file and the transformed file are different, in that the "embedded_malware_string" is broken up in the transformed version. An exemplary transformed file may be represented in the following manner:

```
<!DOCTYPE html>
  <html>
    <body>
      <h1>Document Title </h1>
      <p>Sample    paragraph.    embedded_mal<!%3x4dXABC>ware_string </p>
    </body>
  </html>
```

The insertion of additional whitespace characters at random locations, subject to certain formatting constraints, along with the transformation of the file from a word processor format, for example, to a markup language format, prevents the reconstitution of the original file from the transformed file. Malware strings within these files will be disrupted in random ways that prevent the malware from reconstituting itself since the malware could not have been written using a priori knowledge of the transformations.

For text files, the insertion of the random data as part of the random steganography operation 445 is the last transformation the file undergoes. Image, video, and audio files may undergo another transformation at operation 455.

At operation 455, image, audio, and video files may be compressed to further alter their binary data representation. Additionally, on the alternative, transformations other than compression may be applied. The properties of the transformation may be selected at random using, for example, the random data generated by operations 410 and 415. For example, the degree of compression used for an image file can be selected randomly within limits, or the contrast of the image might be subtly enhanced or reduced. Many other random transformations may be applied at operation 455. The transformations selected may depend on the type of lossy format the file uses (e.g., JPEG for images, MP3 for audio, MP4 for video, etc.) and the extent to which the transformations alter the file in ways perceptible to the user.

At operation 460, any input files present on the RAM Disk along with any intermediate files, are deleted from the file system implemented by the RAM disk in preparation for processing the next input file. By deleting any input and intermediate files at operation 460, data residing in heap memory allocated within the program implementing the IIDT process is overwritten or freed. Upon completion of operation 460, only the transformed files exist in RAM disk.

At operation 465, the transformed files are persisted to non-volatile storage such as a disk or flash drive. The persisted file may be stored locally in the file transfer system 115 and/or in the trusted computer system 110 for further access. The next input file can now be received from un-trusted computer system 105 and processed, in which case the program implementing the IIDT process loops back to operation 425. If no further input files are scheduled for transfer from the un-trusted computer system 105, the method 400 executes post-processing operations, such as tear-down operations.

In method 400, the post-processing or tear-down steps include destroying the RAM disk at operation 470. Destroying the RAM disk eliminates all traces of the original files and intermediate files used in the IIDT process.

The end state of the overall IIDT process is to terminate the program implementing the IIDT process at operation 475. At this point, transformed files reside in persistent storage. All input files have been removed from memory and the RAM disk used to store intermediate files has been destroyed. Any data existing in RAM as part of the IIDT process is therefore eliminated when the process terminates.

The invention claimed is:

1. A file transfer system configured to transfer files from an un-trusted computer system to a trusted computer system, the file transfer system comprising:
  volatile memory; and
  a processing system configured to:
    load a file from the un-trusted computer system into the volatile memory;
    if the file is a text file, convert the text file to a converted file comprising a marked-up version of the text file using a markup language;
    apply information-invariant data transformation (IIDT) operations to the converted file in the volatile memory, the IIDT operations comprising redacting metadata from the converted file and applying a random steganography operation to the converted file, the random steganography operation comprising:
      generating entropy for seeding a random data generator, the entropy generated by recording environmental noise associated with the un-trusted computer;
      generating random data for one or more comments based on the generated entropy, the random data comprising random characters, the one or more comments having a random length;
      formatting the one or more comments in the markup language of the converted file; and
      inserting the one or more comments at random locations within the converted file; and make the transformed file available in a persistent storage that is accessible by the trusted computer system.

2. The file transfer system of claim 1, wherein the volatile memory is a RAM disk.

3. The file transfer system of claim 2, wherein the processing system is configured to destroy the RAM disk after all scheduled files have been transferred from the un-trusted computer system.

4. The file transfer system of claim 1, wherein the processing system is further configured to delete the file from the volatile memory before making the transformed file available in the persistent storage.

5. The file transfer system of claim 1, wherein the processing system is further configured to generate pseudorandom data using a pseudorandom number generator that has been seeded with a source of entropy, wherein the pseudorandom data is used by the processing system during the IIDT operations.

6. The file transfer system of claim 5, wherein the processing system is configured to use the pseudorandom data in a lossy data transformation of the converted file during application of the IIDT operations.

7. The file transfer system of claim 1, wherein the file from the un-trusted computer system is a lossless format file, and wherein processing system is configured to transform the lossless format file to a lossy format file during application of the IIDT operations.

8. The file transfer system of claim 1, wherein, when the file is a text file, the random steganography operation includes insertion of random data into the text file.

9. The file transfer system of claim 1, wherein, when the file is an audio file, an image file, or a video file, the processing system is configured to apply a further transform after application of the random steganography operation.

10. The file transfer system of claim 9, wherein parameters of the further transform are generated pseudorandomly.

11. A computer system comprising:
an un-trusted computer system;
a trusted computer system; and
a file transfer system configured to apply information-invariant data transformation (IIDT) operations on files received from the un-trusted computer system, the files comprising text files that are converted to converted files comprising marked-up versions of the text files using a markup language, wherein the IIDT operations comprise redacting metadata from the converted files and applying a random steganography operation to the converted files, the random steganography operation comprising:
generating entropy for seeding a random data generator, the entropy generated by recording environmental noise associated with the un-trusted computer;
generating random data for one or more comments based on the generated entropy, the random data comprising random characters, the one or more comments having a random length;
formatting the one or more comments in the markup language of the converted file; and
inserting the one or more comments at random locations within the converted file,
wherein the IIDT operations are executed in a first memory storage area, wherein the file transfer system is further configured to make the transformed file available in a second memory storage area that is accessible by the trusted computer system, and wherein the first memory storage area is isolated from the second memory storage area.

12. The computer system of claim 11, wherein the file transfer system is further configured to delete the file from the first memory storage area before making the transformed file available in the second memory storage area.

13. The computer system of claim 11, wherein the first memory storage area comprises a RAM disk, and the second memory storage area comprises persistent storage.

14. The computer system of claim 13, wherein the file transfer system is configured to destroy the RAM disk after all scheduled files have been transferred from the un-trusted computer system.

15. The computer system of claim 11, wherein the file transfer system is configured to transform lossless format files received from the un-trusted computer system to a lossy format during application of the IIDT operations.

16. A method for secure file transfer comprising:
loading a file from an un-trusted computer system into a first memory storage area;
if the file is a text file, converting the text file to a converted file comprising a marked-up version of the text file using a markup language;
applying information-invariant data transformation (IIDT) operations on the file in the first memory storage area, the IIDT operations comprising redacting metadata from the file and applying a random steganography operation to the converted file, the random steganography operation comprising:
generating entropy for seeding a random data generator, the entropy generated by recording environmental noise associated with the un-trusted computer;
generating random data for one or more comments based on the generated entropy, the random data comprising random characters, the one or more comments having a random length;
formatting the one or more comments in the markup language of the converted file; and
inserting the one or more comments at random locations within the converted file; and
making the transformed file available in a second memory storage area that is accessible by a trusted computer system, wherein the first memory storage area is isolated from the second memory storage area.

17. The method of claim 16, further comprising deleting the file from the first memory storage area before making the transformed file available in the second memory storage area.

18. The method of claim 16, further comprising destroying data storage organization of the first memory storage area after all scheduled files have been transferred from the untrusted computer system.

19. The method of claim 16, further comprising generating pseudorandom data using a pseudorandom number generator that has been seeded with a source of entropy, and further comprising using the pseudorandom data with the EDT operations.

20. The method of claim 19, further comprising using the pseudorandom data in a lossy data transformation of the converted file during application of the IIDT operations.

21. The method of claim 16, further comprising transforming files received in lossless format file to a lossy format during application of the IIDT operations.

* * * * *